US012144433B2

(12) United States Patent
Floros et al.

(10) Patent No.: US 12,144,433 B2
(45) Date of Patent: Nov. 19, 2024

(54) SMART CUPHOLDER SYSTEM

(71) Applicants: Donna Floros, Studio City, CA (US);
Kim Elyn Baccigaluppi, Burbank, CA (US)

(72) Inventors: Donna Floros, Studio City, CA (US);
Kim Elyn Baccigaluppi, Burbank, CA (US)

( * ) Notice: Subject to any disclaimer, the term of this patent is extended or adjusted under 35 U.S.C. 154(b) by 87 days.

(21) Appl. No.: 18/123,263

(22) Filed: Mar. 18, 2023

(65) Prior Publication Data
US 2023/0329441 A1    Oct. 19, 2023

Related U.S. Application Data

(60) Provisional application No. 63/331,105, filed on Apr. 14, 2022.

(51) Int. Cl.
| *A47K 1/08* | (2006.01) |
| *A47C 7/62* | (2006.01) |
| *A47C 7/72* | (2006.01) |
| *F16M 13/00* | (2006.01) |
| *H04M 1/04* | (2006.01) |

(52) U.S. Cl.
CPC ............. *A47C 7/622* (2018.08); *A47C 7/723* (2018.08); *H04M 1/04* (2013.01)

(58) Field of Classification Search
CPC ........... A47C 7/62; A47C 7/624; A47C 7/626; A47C 7/622
See application file for complete search history.

(56) References Cited

U.S. PATENT DOCUMENTS

| 2,926,879 | A | * | 3/1960 | Dietrich | B63B 29/12 224/406 |
| 4,557,452 | A | * | 12/1985 | Khuong | A47G 23/0225 248/214 |
| 4,697,780 | A | * | 10/1987 | Wenkman | F16M 11/041 248/314 |
| 4,786,023 | A | * | 11/1988 | Harris | B43K 23/002 248/311.2 |
| D309,848 | S | * | 8/1990 | Sokolski | D7/620 |
| 5,279,452 | A | * | 1/1994 | Huynh | B60N 3/103 248/314 |
| 5,938,160 | A | * | 8/1999 | Hartmann | F16M 13/022 248/909 |
| 6,010,104 | A | * | 1/2000 | Hanson | A47C 7/622 248/312.1 |
| 6,283,042 | B1 | * | 9/2001 | Wargo | A47D 15/00 108/26 |
| 6,478,371 | B1 | * | 11/2002 | Clarke | A47G 23/0225 297/188.2 |
| 6,641,101 | B2 | * | 11/2003 | Bergin | A47C 7/62 248/223.41 |
| 8,033,518 | B2 | * | 10/2011 | Schuchman | A47G 23/0225 224/679 |
| 8,636,319 | B1 | * | 1/2014 | Parker, Jr. | A47C 7/62 297/188.21 |
| 8,777,170 | B2 | * | 7/2014 | Gilbert | A47F 7/00 24/3.12 |
| D734,305 | S | * | 7/2015 | Wengreen | D14/238.1 |

(Continued)

*Primary Examiner* — Shin H Kim
(74) *Attorney, Agent, or Firm* — Paul D. Chancellor; Ocean Law

(57) ABSTRACT

A cupholder includes a housing, plate, and backing, the housing for holding a cup and the backing for holding a cell phone.

5 Claims, 6 Drawing Sheets

(56) References Cited

U.S. PATENT DOCUMENTS

| | | | |
|---|---|---|---|
| 10,278,527 B2* | 5/2019 | Hayward | A45F 5/021 |
| 11,160,355 B2* | 11/2021 | Martinez | B60N 3/101 |
| 11,503,916 B2* | 11/2022 | Clarke | A47C 7/622 |
| 11,507,937 B2* | 11/2022 | Bruce | H04N 21/6547 |
| 2019/0307253 A1* | 10/2019 | Pendleton, Jr. | A47C 7/624 |
| 2020/0385172 A1* | 12/2020 | Reed | F16B 2/08 |
| 2021/0401182 A1* | 12/2021 | Clarke | A47C 7/622 |
| 2022/0115907 A1* | 4/2022 | Bober | H02J 50/005 |
| 2023/0329441 A1* | 10/2023 | Floros | H04M 1/04 |

* cited by examiner

SMART CUPHOLDER SYSTEM

PRIORITY CLAIM

This application claims the benefit of U.S. Prov. Pat. App. No. 63/331,105 filed Apr. 14, 2022. This application is a continuation in part of U.S. Design patent application Ser. No. 29/834,913 filed Apr. 14, 2022.

BACKGROUND OF THE INVENTION

Field of the Invention

The invention relates to a manufactured device. More particularly, the invention relates to a holder for a cup and its adaptations for use in various applications.

Discussion of the Related Art

Accessories for holding drinking cups are perhaps best known as the pockets/receivers found between the front seats or extending from the dash/front panel of an automobile. Cupholders may also be used as sockets into which yet another accessory is inserted, the accessory for holding a particular item such as a cellular telephone.

SUMMARY OF THE INVENTION

A smart cupholder or smart cupholder system for a cup which may be mounted to seating such as to the back of a seat in stadium or event seating.

In an embodiment, a cupholder comprises: stacked portions any of which may be integral; the stacked portions include a block-like housing which adjoins a plate which adjoins a backing; a semi-circular cut-out in a face of the housing, the cut-out being open at an upper end and adjoining a housing floor at a lower end; the plate having side shoulders that adjoin a forward inset surface from which pins protrude; a rotatable semi-circular bail that when rotated about the pins to meet the housing completes the circle near the cut-out open end; a backing rear wall and a backing front wall with a gap therebetween, the backing front wall covering only a portion of the backing rear wall; wherein the bail captures a cup between the bail and the cut-out, a cell phone is inserted in the gap, and a top of the cup is below an uncovered portion of the rear wall such that more than half of a cell phone screen appears above the front wall.

DETAILED DESCRIPTION OF THE PREFERRED EMBODIMENTS

The disclosure provided in the following pages describes examples of some embodiments of the invention. The designs, figures and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention. Where suitable, unless otherwise indicated, features of two or more embodiments may be combined.

Figure 1A:
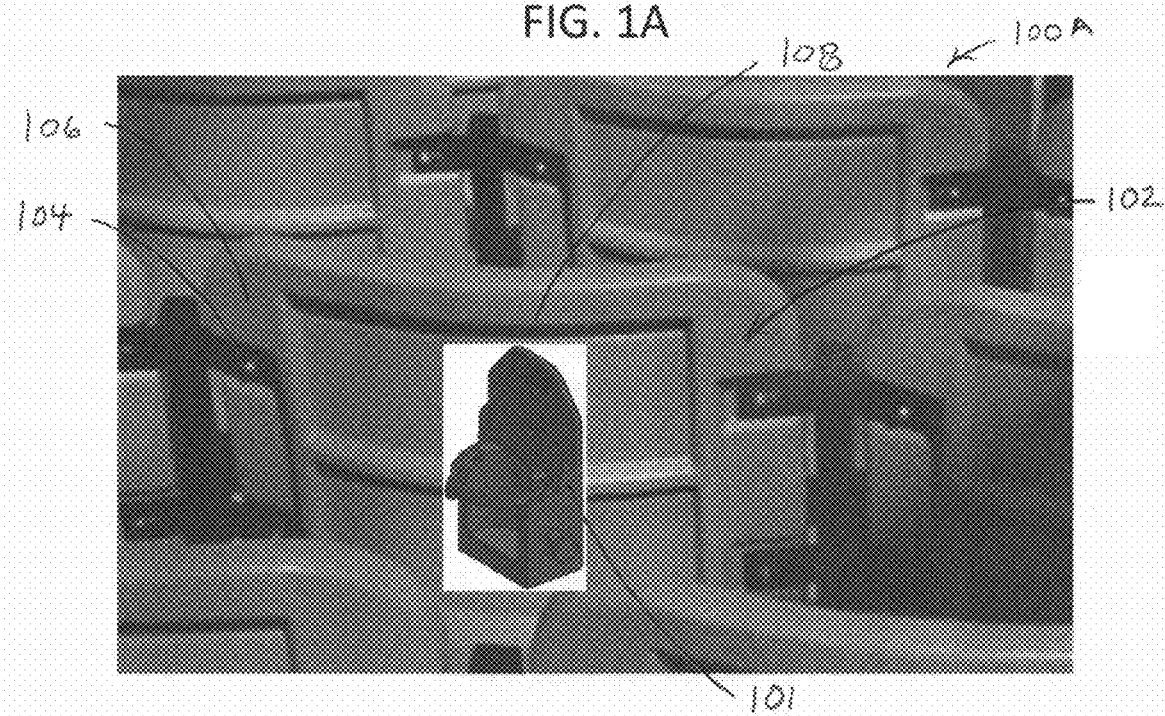
FIGS. 1A-B show cupholder and stadium seating embodiments, the cupholder for mounting via a seat or a seat back.

FIG. 1A shows a cupholder installed about centered on the back of a stadium style seat 100A. In particular, a cupholder similar to the cupholder 101 shown is mounted at or near a center 108 of the back support 106 of a seat or stadium seat 102. The cupholder may be fixed to the seat back or seat sides/perimeter via a fastener (e.g., 104), glue, magnet, latch, or the like.

Figure 1B:
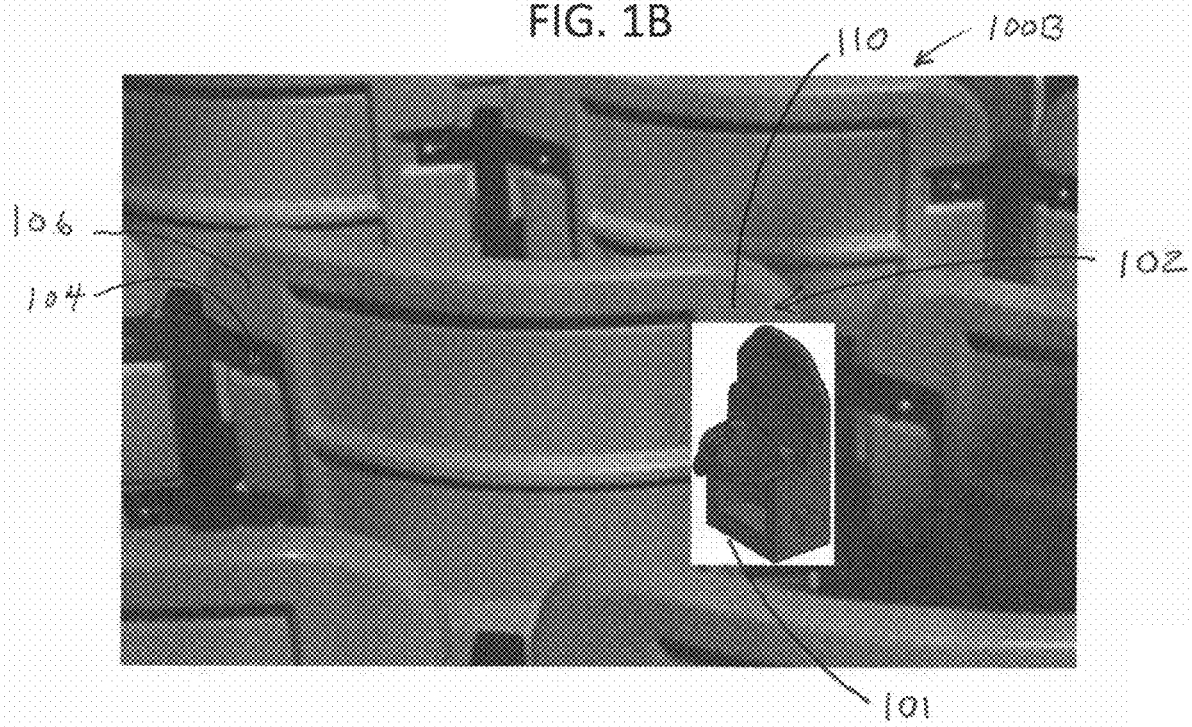

FIG. 1B shows a cupholder to one side (right side mount shown) on the back of a stadium style seat 100B. In particular, a cupholder similar to the cupholder 101 is mounted at or near an edge 110 of the back support 106 of a seat or stadium seat 102. The cupholder may be fixed to the seat back or seat sides/perimeter via a fastener (e.g., 104), glue, magnet, latch, or the like.

In other embodiments, the cupholder, for example a cupholder like or similar to cupholder 101, may be mounted on a seat, on a seat back, on an armrest such as a seat armrest, on a wall, on a bathroom stall, wheel chair, or on another suitable mounting item or surface.

FIGS. 2A-D show a cupholder mounted by various exemplary means to a seat or seat back 200A-D.

Figure 2A:
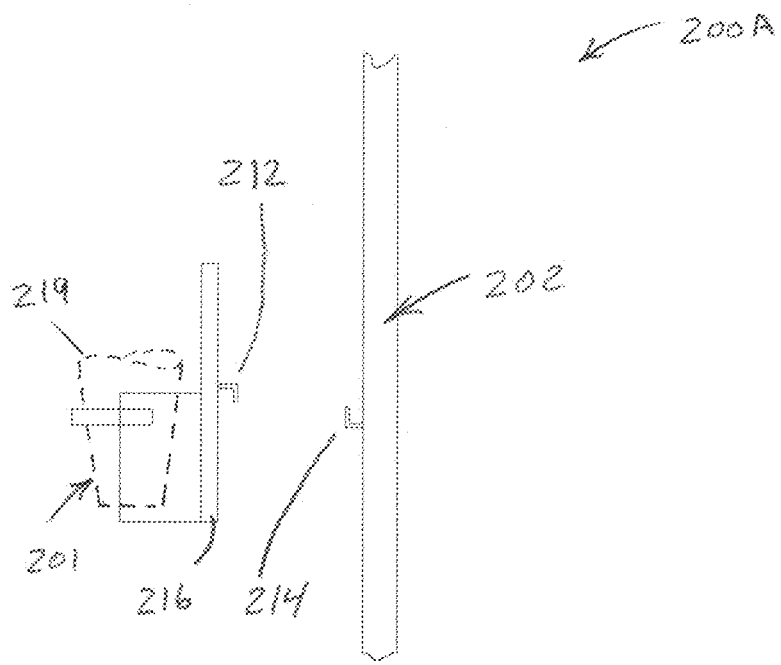
FIGS. 2A-D show mounting means for mounting the cupholder to a seat or a seat back.

FIG. 2A shows a cupholder 201 and a seat back 202 with engagement clip(s). The cupholder has an angular clip 212 at its back 216 such as an angular clip extending from its back. A mating clip 214 on the seat back is for engaging the cupholder clip. In various embodiments, the clips are arranged such that vertical engagement provides support for the cupholder. For example, the cupholder clip may be pointed down while the seat back clip may be pointed up. An exemplary cup 219 is shown in the cupholder. The cup may be paper, plastic, or another material such as a flexible material. The cup may have a small diameter at its base and a larger diameter at its mouth. The cup may have sloped sides. The cup may include a lid such as a plastic lid.

Figure 2B:
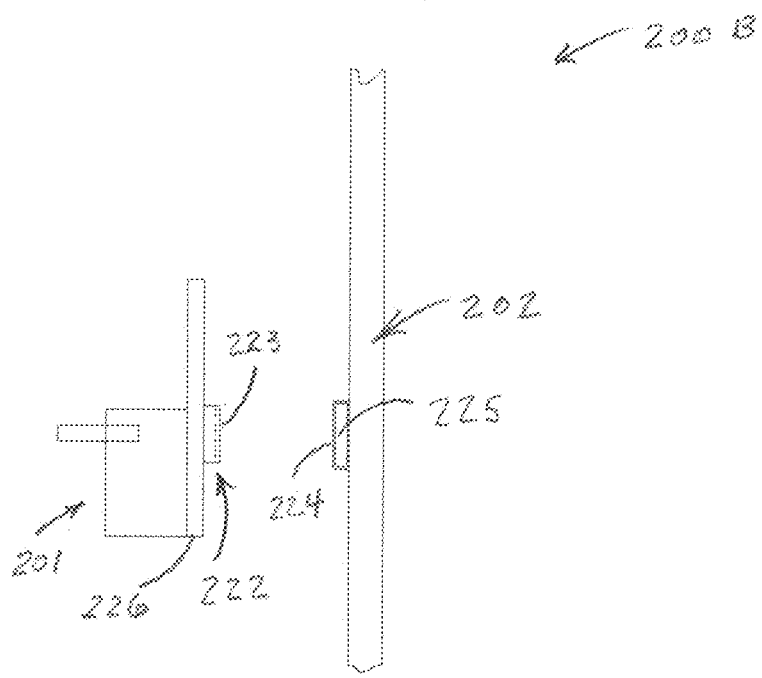

FIG. 2B shows a cupholder 201 and a seat back 202 with an engagement slot. The cupholder has a U-shaped clip 222 on the cupholder back 226, with a free end 223 which is for engaging the slot 225 in a fixture 224 mounted to the seat back. In various embodiments, the clip free end and the slot are arranged such that horizontal engagement provides support for the cupholder. For example, the slot may be horizontally oriented and the clip free end may be horizontally oriented.

Figure 2C:
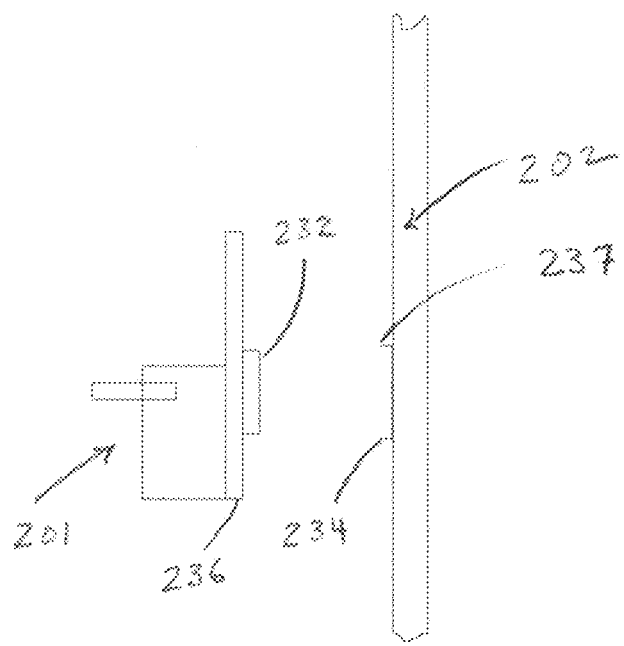

FIG. 2C shows a cupholder 201 affixable to a seat back 202 via a magnetic. The cupholder has one of a ferrous plate or a magnet such as a super-magnet (e.g., neodymium) 232 mounted to the cupholder back 236. The seat back has the other of a ferrous plate or a magnet such as a super-magnet 234. Magnetic attraction between the ferrous plate and the magnet provides support for the cupholder. In various embodiments, the ferrous plate may include projections 237 that surround all or a portion of a perimeter of the magnet such that insertion of the magnet into a pocket formed by the ferrous plate or ferrous plate sidewalls provides support for the cupholder. The magnet may be an electromagnet operated and/or indicated locally or remotely.

Figure 2D:
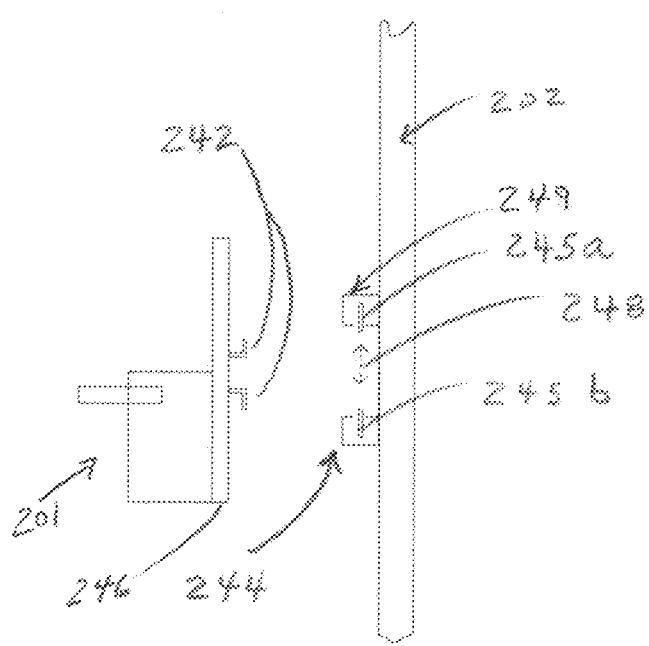

FIG. 2D shows a cupholder 201 and a seat back 202 with a pin or plate latch engagement assembly 244. One of the cupholder back 246 and the seat back 202 have a hook or hooks 242. One of the cupholder back and seat back have a frame 249 with pins or plates 245a, 245b that are movable 248 for engagement with the hooks. Movement of the pins or plates may be locally or remotely controlled and the local or remote sensing may indicate fixation or not of the cupholder and the seat back. The pins or plate may be operated to fix the cupholder to the seat back via a rotatable operator which may require a tool or key for operation.

Figure 3A:
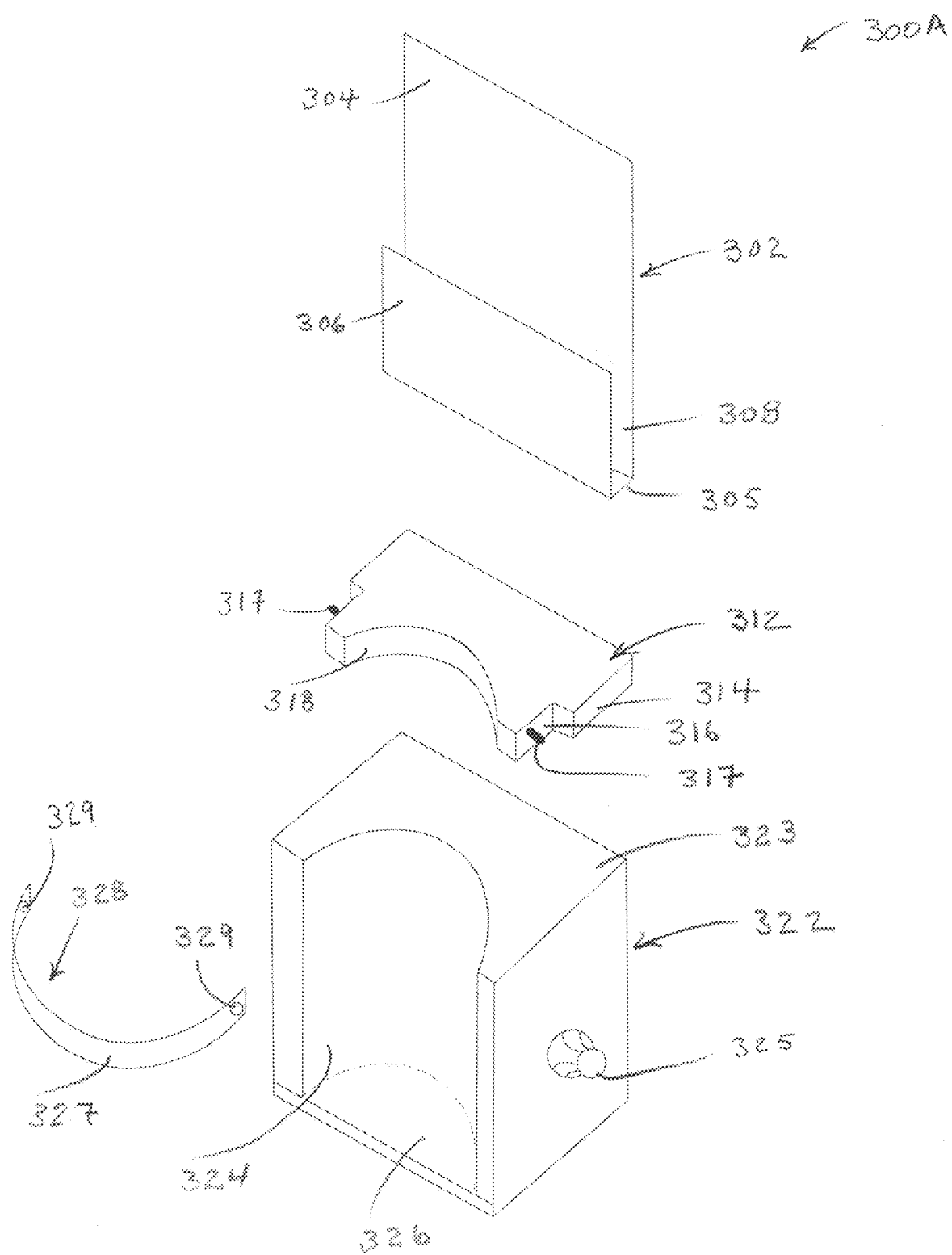
FIGS. 3A-B show embodiments of a cupholder housing, plate, and backing.

FIG. 3A shows an embodiment of the cupholder 300A. As shown, the cupholder includes an upper backing or backing 302, an intermediate plate or plate 312, a lower housing or housing 322, and a partial hoop or hoop/bail 328. The housing, plate, and backing may be stacked or adjoining portions. The hoop is for attachment such as rotatable attachment at fixtures or pins 317. For example, hoop holes or hoop end holes 329 may engage pins 317.

In some embodiments, the plate 312 sits atop the housing 322 and the backing 302 sits atop the plate, these parts being fixed to one another. In some embodiments any of backing, plate, and housing are integral, for example the backing, plate, and housing may be molded from a moldable material such as a moldable plastic.

The backing 302 may include a rear wall 304 and/or a front wall 306 which may be joined by a lower web 305. The lower web may be part of the plate 312. The front wall may cover only a portion of the rear wall and a gap therebetween 308 may provide a holder for holding an item such as a cell phone.

The plate 312 may be generally rectangular, have side shoulders 314 that adjoin a forward inset surface 316 from which fasteners or pins 317 protrude. As shown, the front of the plate includes a simi-circular cutout 318 that may generally match a frontal cutout 324 in the housing 322.

The housing 322 may be generally in the form of a block having a frontal cutout 324 above a floor 326 of the housing. The floor may be for supporting a cup base. The plate 312 may be mounted or integral with a top 323 of the housing. In some embodiments, one or more side projections or posts 325 provide a support to which items may be fixed or hung, for example a projection from a side of the housing from which a purse is hung.

The hoop or partial hoop 328 may be simi-circular in shape such as a semi-circular band 327. In addition, the hoop may have points of fixation or rotation such as holes 329 for engaging points of fixation or rotation such as pins 317 protruding from the sides of the plate 312.

Assembly of the cupholder 300A provides a rest for a cup (not shown) on the floor 326 of the housing wherein a cup curved surface is received by the housing semi-circular cutout 324.

Figure 3B:
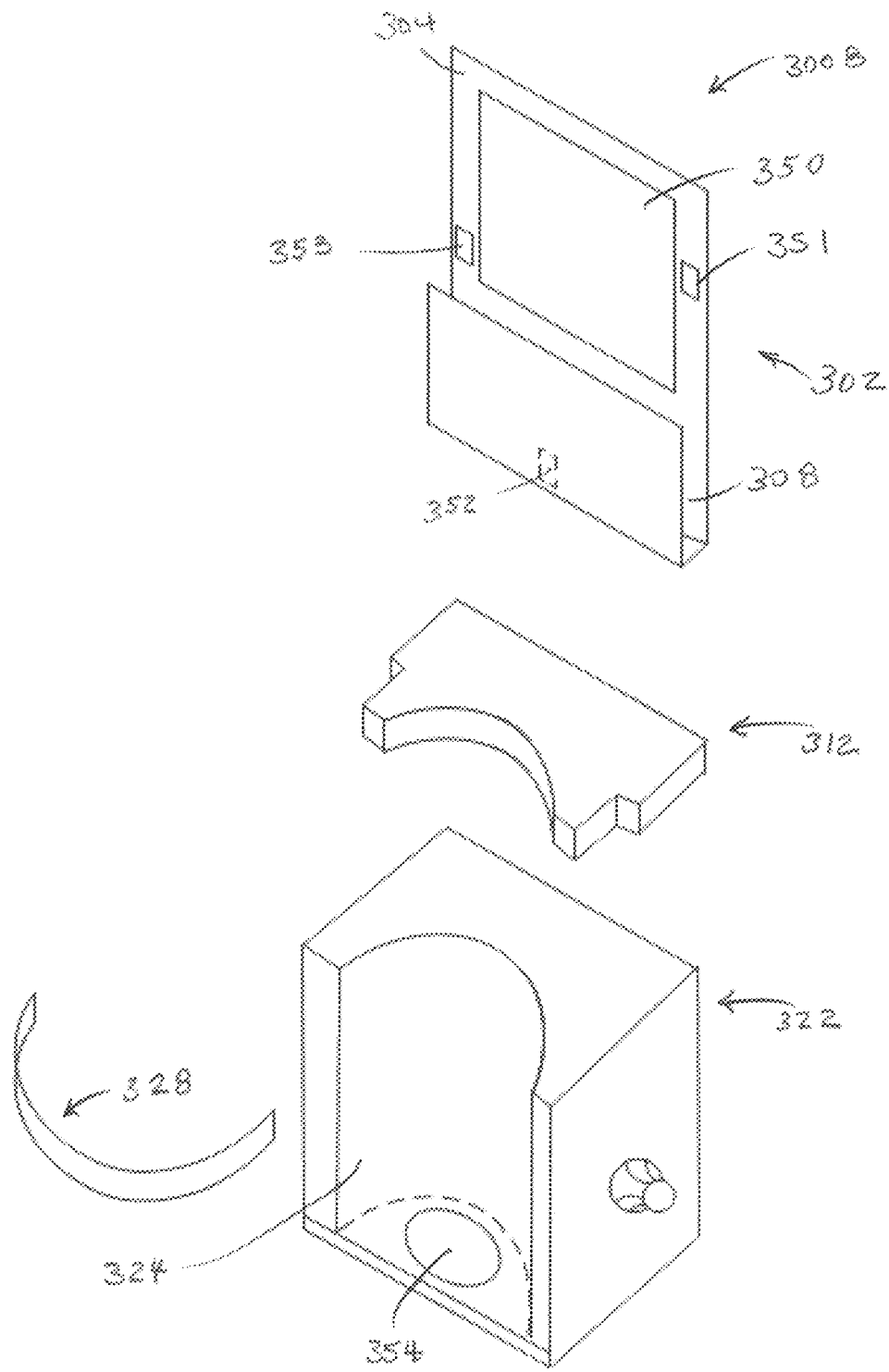

FIG. 3B shows another embodiment of a cupholder 300B. Here, the cupholder is illustrated as including four portions, a backing 302 with a display 350 and an audio output or connector 351, a plate 312, a housing 322, and a hoop 328.

The display 350 may be any device for visualizing symbols, text, graphics, and the like. The display may include any display devices such as e-paper, semiconductor, thin film, flat panel, liquid crystal, LCD, LED, OLED, and/or QLED devices.

In various embodiments, the display may provide or exchange information with a user such as information relating to an event the user is experiencing. In various embodiments, the display or a placard may provide or exchange information with a user for the purpose of advertising, providing information, and/or answering user questions.

In various embodiments, the display and/or cupholder electronics may operate and/or communicate directly or indirectly with the Internet or with a special purpose server via NFC, wireless such as WiFi or bluetooth, or hardwired.

In various embodiments, one or more of the cupholder, cupholder electronics, and the cupholder display may be directly or indirectly connected with and/or draw electric power from battery(s) or an electric power grid. Where batteries are used, they may be integrated into the cupholder.

The audio output or connector 351 may provide one or both of an audio output as by a speaker or transducer and/or a connector. The connector may be a wired connector or a wireless connector providing a WiFi or Bluetooth connection. The wired connector may provide a connection for a wired device such as a headphone or earbud device. The wireless connector may provide a connection for a wireless device such as a computing device or a Bluetooth device such as a headphone or earbud device.

The cupholder 300B may include one or more sensors or transducers ("sensors"). Each sensor may include any one or more of a switch, a touch switch, a proximity sensor, a weight sensor, and a heat sensor. Each sensor may indicate position or presence of an object, temperature of an object, motion of an object, or a physical state of an object.

Operation of the display 350 and/or the audio connection 351 may be controlled by voice control or by hand manipulated selector(s) 353. Operation of the display and/or the audio connection may be subject to the state(s) of one or more sensors such as switch(es) or transducer(s). Operation of the features below may be controlled by voice control or by hand manipulated selectors(s) 353.

In an embodiment, an upper sensor 352 checks for presence of a device or object such as a cell phone (not shown) in or near the backing gap 308 and a lower sensor 354 checks for the presence of a cup in the housing 322. The cup may be of various dimensions, for example the cup situated in the cupholder 300B may have be of various heights and triggers only lower sensor 354 or both of sensors 352 and 354. In various embodiments, the upper sensor 352 includes detection for presence of a cell phone and is positioned accordingly. In various embodiments, the lower sensor 354 includes detection for presence of a cup and is positioned accordingly.

Operation of the display 350 may require that sensor 352 indicate no device is present in the gap 308 which may or may not be irrespective of sensor 354 indications. Operation of the display may require that sensor 354 indicate no cup is present in the housing which may or may not be irrespective of sensor 352 indications. Operation of the display may require that sensors 352, 354 indicate no device is present in the backing gap and no cup is present in the housing.

In an embodiment, sensors such as upper sensor 352 and lower sensor 354 may indicate presence or proximity of an object. For example, in an embodiment, indications of a cup by sensor 354 prevent display operation. In an embodiment, the lower sensor may in combination with a display such as display 350 provide a bar graph like indication of the contents of a cup inserted in the holder cutout 324.

In an embodiment, sensors such as upper sensor 352 and lower sensor 354 may indicate presence or proximity of an object. In this embodiment operation of the display 350 is explained in the table below:

| Object Presence Is Indicated By Sensor(s) | Object Presence Is Not Indicated By Sensor(s) | Display Operation (Yes/No) |
|---|---|---|
| 352, 354 | | No |
| 352 | 354 | No |
| 354 | 352 | Yes |
| | 352, 354 | Yes |

In an embodiment, sensors such as upper sensor 352 and lower sensor 354 may indicate presence or proximity of an object. In this embodiment, operation of the display 350 is explained in the table below:

| Object Presence Is Indicated By Sensor(s) | Object Presence Is Not Indicated By Sensor(s) | Display Operation (Yes/No) |
|---|---|---|
| 352, 354 |  | No |
| 354 | 352 | No |
| 352 | 354 | No |
|  | 352, 354 | Yes |

In an embodiment, sensor 352 includes a heater and a sensor for sensing the presence of a cup in the cupholder 300B. The heater may not operate if sensor 352 fails to indicate the presence of a cup in the cupholder. The heater may operate if sensor 352 indicates the presence of a cup in the cupholder. In some embodiments, the presence of a person in a seat facing the cupholder is required for heater operation or heater operation that exceeds a predetermined time. A person's presence may be indicated by sensor 352 and/or sensor 354 or by another sensor coupled to the cupholder 300B.

In an embodiment, sensor 352 includes a cell phone charger and/or an internet connection. In some embodiments, the cell phone charger may not operate unless sensor 352 indicates a cell phone is present. In some embodiments, the cell phone charger may operate if sensor 352 indicates a cell phone is present.

Figure 4:
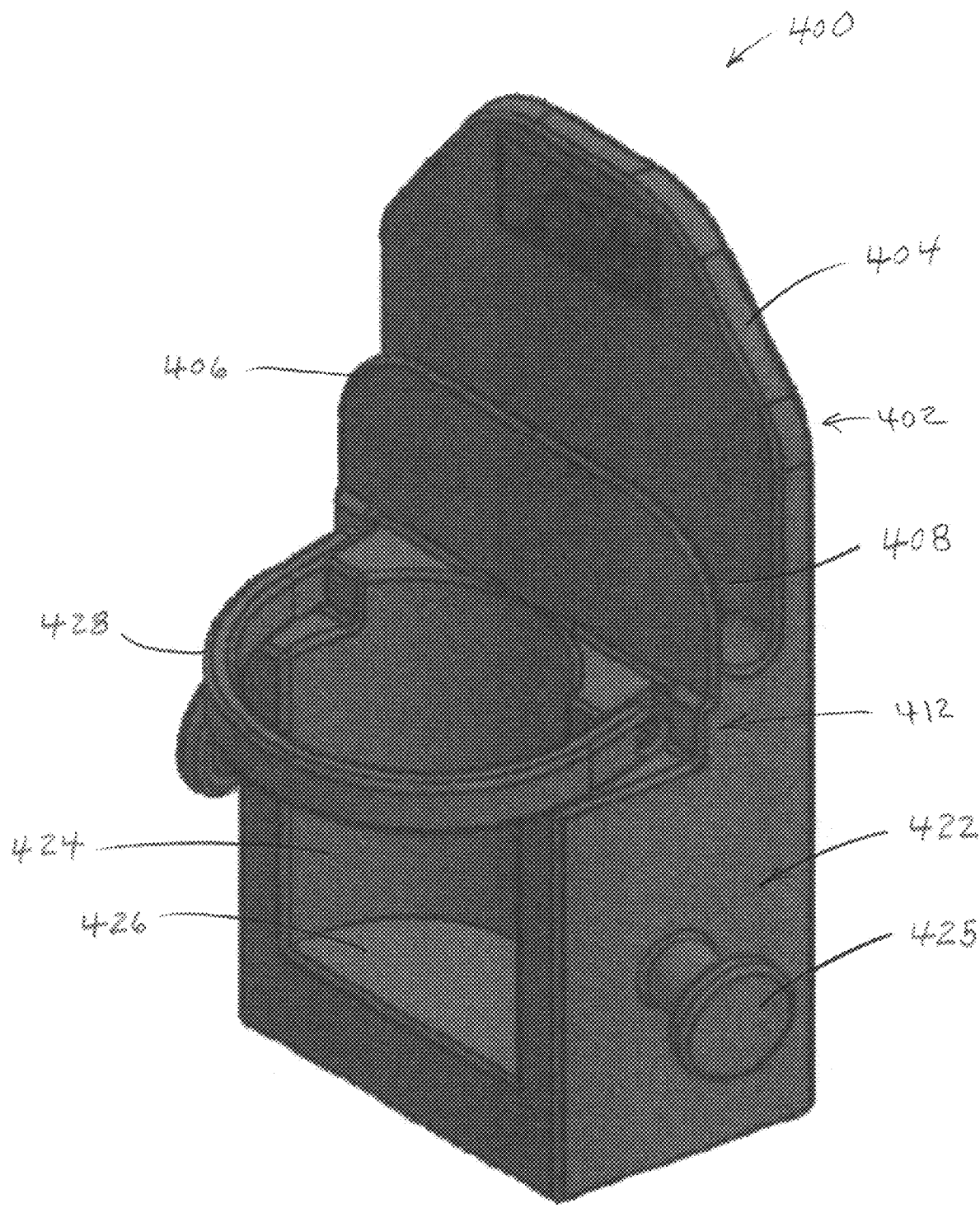
FIG. 4 shows an embodiment of a molded cupholder.

FIG. 4 shows another embodiment of a cupholder 400 such as a molded cupholder. In the figure, a backing 402 includes a rear wall 404 and a front wall 406 with a gap 408 therebetween. The backing adjoins a plate-like layer 412 having a bail or hoop 428 such as a rotatable bail attached thereto, the bail for surrounding a cup (not shown) inserted in the cupholder. The plate adjoins a lower housing 422 having a frontal semicircular cutout 424 and a floor 426. Rotation of the bail away from the housing into a somewhat vertical or vertical orientation provides a more compact configuration.

The floor 426 is for supporting a cup (not shown) that is inserted in the semicircular cutout 424. In various embodiments, a housing sidewall projection 425 provides a hanger from which an item such as a purse is hung. The cup may be of various dimensions, for example the cup situated in the cupholder 400 may have a variable height that triggers only the lower sensor 354 or both the lower sensor 354 and the upper sensor 352.

While various embodiments of the present invention have been described above, it should be understood that they are presented by way of example only, and not limitation. It will be apparent to those skilled in the art that various changes in the form and details can be made without departing from the spirit and scope of the invention. As such, the breadth and scope of the present invention should not be limited by the above-described exemplary embodiments but should be defined only in accordance with the following claims and equivalents thereof.

What is claimed is:

1. A cupholder comprising:
stacked portions any of which may be integral;
the stacked portions include a block-like housing which adjoins a plate which adjoins a backing;
a semi-circular cut-out in a face of the housing, the cut-out being open at an upper end and adjoining a housing floor at a lower end, the housing floor for supporting a cup inserted in the housing cut-out;
the plate having side shoulders that adjoin a forward inset surface from which pins protrude;
a rotatable semi-circular bail that when rotated about the pins to meet the housing completes the circle near the cut-out open end; and,
a backing rear wall and a backing front wall with a gap therebetween, the backing front wall covering only a portion of the backing rear wall;
wherein the bail is for capturing the cup between the bail and the cut-out, and the gap is for receiving a cell phone end.

2. The cupholder of claim 1 further comprising:
an electronic display screen attached to the backing rear wall; and,
a first electrical sensor for detecting the presence or absence of a cell phone in the gap;
wherein the electrical sensor influences the operation of the electronic display screen.

3. The cupholder of claim 2 further comprising;
a second electrical sensor for detecting the presence or absence of a cup inserted in the housing;
wherein the electrical sensor influences the operation of the electronic display screen.

4. The cupholder of claim 3 wherein:
the electronic display screen is operative when the first electrical sensor detects no cell phone and the second electrical sensor detects no cup.

5. The cupholder of claim 3 wherein:
the electronic display screen is viewable over a top of the cup;
the electronic display screen is operative when the first electrical sensor detects no cell phone.

* * * * *